United States Patent Office 3,661,954
Patented May 9, 1972

3,661,954
SILYLALKYL PHENYLTHIOLATES
Gary E. LeGrow, Midland, Mich., assignor to Dow Corning Corporation, Midland, Mich.
No Drawing. Filed July 13, 1970, Ser. No. 54,666
Int. Cl. C07f 7/10, 4/18
U.S. Cl. 260—448.2 N          4 Claims

ABSTRACT OF THE DISCLOSURE

Thiolbenzoic acid is added to alkenylsilanes or siloxanes to give compounds of the formula $$C_6H_5C{=}OSRSiR'_nX_mO_{\frac{4-n-m}{2}}$$

For example, thiolbenzoic acid is added to vinyldimethylchlorosilane under the influence of ultraviolet light to give $C_6H_5C{=}OS(CH_2)_2Si(CH_3)_2Cl$. The thiolates are useful as intermediates in the preparation of mercaptoalkylsilanes and siloxanes.

---

Mercaptoalkylsilanes and siloxanes are well known materials and have found wide utility. They are used, for example, to increase the adhesion of vinylic polymers to siliceous substrates, as lubrication additives and as modifiers for organic plastic materials. Applicant has found that these desirable mercaptoalkylsilanes can be prepared by reacting the compositions of this invention with amonia as will be described in more detail hereafter. The instant thiolates can be used to prepare mercaptoalkyl silanes and siloxanes in which the mercaptoalkyl group is of any chain length. The materials of this invention are particularly desirable starting materials for the preparation of a β-mercaptoethylsilanes and siloxanes.

This invention relates to compounds of the formula $$C_6H_5C{=}OSRSiR'_nX_mO_{\frac{3-n-m}{2}}$$

in which R is an alkylene radical of at least 2 carbon atoms, R' is a monovalent hydrocarbon or halohydrocarbon radical free of aliphatic unsaturation, X is halogen, alkoxy, carboxyacyl, ketoxime, amineoxy or OH, X being free of aliphatic unsaturation, n is 0 to 2, m is 0 to 3, and the sum of n+m being no greater than 3.

This invention further relates to copolymeric siloxanes having at least one siloxane unit of the formula $$C_6H_5C{=}OSRSiR'_nX_mO_{\frac{3-n-m}{2}}$$

in which R, R' and X are as above defined, n and m each have values from 0 to 2, any remaining siloxane units being of the formula $$R''_aSiO_{\frac{4-a}{2}}$$

in which R" is an R group or an X group, and a is an integer from 0 to 3 inclusive.

The compositions of this invention are best prepared by adding thiolbenzoic acid to the corresponding alkenylsilane or siloxane under the influence of a free radical generator such as peroxides such as benzoyl peroxide; azo-bis-nitriles such as azo-bis-isobutyronitrile or radiant energy such as ultraviolet light, X-rays or gamma-rays. The temperature of the addition is not critical and temperatures from 30 to 100° C. are sufficient.

For the purpose of this invention R can be any alkylene radical of at least 2 carbon atoms such as dimethylene, trimethylene, tetra-methylene or octadecamethylene. R can be either straight chain or branched in structure.

R' can be any monovalent hydrocarbon radical or halohydrocarbon radical free of aliphatic unsaturation such as alkyl radicals such as methyl, ethyl, isopropyl or octadecyl; cycloaliphatic hydrocarbons radicals such as cyclopentyl, cyclohexyl or methylcyclohexyl; aromatic hydrocarbon radicals such as phenyl, xenyl, naphthyl, anthracyl, tolyl or xylyl; aralkyl hydrocarbon radicals such as benzyl, β-phenylethyl or β-phenylpropyl. R' can also be any halogenated monovalent hydrocarbon radical such as chloromethyl, gamma-chloropropyl, dibromophenyl, 3,3,3-trifluoropropyl, bromo-cyclohexyl, chlorophenyl, α,α,α-trifluorotolyl or iodophenyl.

X can be various types of hydrolyzable radicals such as the alkoxy [1] radical such as methoxy, ethoxy, isopropoxy, octadecyloxy, β-methoxyethoxy, β-ethoxyethoxy, —(OCH$_2$CH$_2$)$_2$OCH$_3$, —OCH$_2$CH(CH$_3$)OC$_2$H$_5$, β-hydroxyethoxy or β-hydroxyisopropoxy. X can also be any carboxyacyl radical such as formoyl, acetyl, propionyl, benzoyl, cyclohexoyl or stearoyl. X can also be any ketoxime radical of the formulae —ON=CB$_2$ or $$-ON{=}\overset{\frown}{C\ B'}$$

in which B is any hydrocarbon radical such as methyl, ethyl, octadecyl, phenyl, cyclohexyl or benzyl, and B' is divalent hydrocarbon radical such as trimethylene or hexamethylene. X can also be any amineoxy radical of the formula B$_2$NO— in which B is any of the monovalent hydrocarbon radicals shown above.

As can be seen the compositions of this invention can be silanes or siloxanes. The siloxanes can be homopolymeric or they can be copolymeric in which each of the silicons has one of the phenylthiolate groups attached thereto. Also the compositions of this invention can be copolymers of siloxanes in which at least one unit has a phenylthiolate group attached to the silicon and the remaining siloxane units are of the formula $$R''_aSiO_{\frac{4-a}{2}}$$

in which R" can be any of the radicals shown above for X and for R. It can be seen therefore that the copolymers can contain units of the formulae SiO$_2$, R"SiO$_{3/2}$, R"$_2$SiO and R"$_3$SiO$_{.5}$. It can also be seen that when D represents the radical C$_6$H$_5$C=OSR—, the siloxanes of this invention can contain units of the formulae DSiO$_{3/2}$, DR'SiO, DR'$_2$SiO$_{.5}$, DXSiO, DX$_2$SiO$_{.5}$ and DR'XSiO$_{.5}$. In any copolymer the units can vary with respect to the type of D group or the type and/or number of R' and X groups.

The composition of this invention can be converted to the corresponding mercaptans by reacting them with gaseous ammonia. Reaction takes place rapidly by merely passing the gaseous ammonia through the phenylthiolate at temperatures of 50° C. In general, an exothermic reaction occurs with the formation of the corresponding mercaptan and the byproduct benzamide.

The following examples are illustrative only and should not be construed as limiting the invention which is properly delineated in the appended claims. The following abbreviations are used infra, Vi for vinyl, Me for methyl, Et for ethyl and Ph for phenyl.

EXAMPLE 1

A mixture of 264 g. of vinylmethyldimethoxysilane, 138 g. of thiolbenzoic acid and a catalytic amount of azo-bis-isobutyronitrile was irradiated in quartz glassware for 69 hours with stirring. The irradiation was done with ultraviolet light. Investigation of the product by nuclear ---
[1] The term "alkoxy" includes alkoxyalkoxy radicals and hydroxyalkoxy radicals.

magnetic resonance showed it to be the compound of the formula (MeO)$_2$MeSiCH$_2$CH$_2$SO=CPh.

EXAMPLE 2

A mixture of 296 g. of vinyltrimethoxysilane containing a catalytic amount of azo-bis-isobutyronitrile was heated at 60° C. as 138.2 g. of thiolbenzoic acid was added over a period of one hour. The solution was then heated 20 hours at 70° C. The product was then irradiated for 71 hours in quartz glassware with ultraviolet light. The residue was strip distilled to give the product (MeO)$_3$SiCH$_2$CH$_2$SO=CPh.

EXAMPLE 3

A stirred mixture of 55.3 g. of thiolbenzoic acid, 48.3 g. of vinyldimethylchlorosilane and a catalytic amount of azo-bis-isobutyronitrile was irradiated with light of 2537 A. wavelength for 26 hours. There was obtained the product PhC=OS(CH$_2$)$_2$SiMe$_2$Cl having the following properties: B.P. 129° C. at .1 mm., $n_D^{25}$ 1.5535 and $d_4^{25}$ 1.1055. No α adduct was found.

EXAMPLE 4

This example illustrates the preparation of a mercaptoalkylsilane.

An excess of ammonia was blown into (MeO)$_2$MeSiCH$_2$CH$_2$SO=CPh for two hours at 50° C. The liquid product was separated from the benzamide byproduct and was found to be HSCH$_2$CH$_2$SiMe(OMe)$_2$.

EXAMPLE 5

A solution of 276 g. of thiolbenzoic acid and 186 g. of divinyltetramethyldisiloxane containing a trace of azo-bis-isobutyronitrile was stirred and irradiated at 2537 A. in a quartz tube for 72 hours. At the end of this time the acid and vinyldisiloxane had been consumed. The product was the compound [C$_6$H$_5$C=OSCH$_2$CH$_2$Si(CH$_3$)$_2$]$_2$O having $n_D^{25}$ 1.5590 and $d_4^{25}$ 1.123.

EXAMPLE 6

When the following silanes are reacted with thiolbenzoic acid in accordance with the procedure of Example 1, the following products are obtained. Z is the group PhC=OS—.

| Silane | Product |
| --- | --- |
| CH$_2$=CHCH$_2$SiPhCl$_2$ | Z(CH$_2$)$_3$SiPhCl$_2$ |
| CH$_2$=C(Me)CH$_2$SiC$_{18}$H$_{37}$(OOCMe)$_2$ | ZCH$_2$CH(Me)CH$_2$SiC$_{18}$H$_{37}$(OOCMe)$_2$ |
| ViSi(CH$_2$CH$_2$CH$_2$Cl)(OEt)$_2$ | Z(CH$_2$)$_2$Si(CH$_2$CH$_2$CH$_2$Cl)(OEt)$_2$ |
| ViSiC$_6$H$_{11}$(OCH$_2$CH$_2$OMe)$_2$ | Z(CH$_2$)$_2$SiC$_6$H$_{11}$(OCH$_2$CH$_2$OMe)$_2$ |
| ViSi(C$_6$H$_4$Me)(OC$_{18}$H$_{37}$)$_2$ | Z(CH$_2$)$_2$Si(C$_6$H$_4$Me)(OC$_{18}$H$_{37}$)$_2$ |
| ViCSi(CH$_2$CH$_2$CF$_3$)(ON=CMe$_2$)$_2$ | Z(CH$_2$)$_2$Si(CH$_2$CH$_2$CF$_3$)(ON=CMe$_2$)$_2$ |
| ViSi(CH$_2$CH$_2$Ph)(ONMe$_2$)$_2$ | Z(CH$_2$)$_2$Si(CH$_2$CH$_2$Ph)(ONMe$_2$)$_2$ |
| ViSi(C$_6$H$_3$Br$_2$)(OMe)$_2$ | Z(CH$_2$)$_2$Si(C$_6$H$_3$Br$_2$)(OMe)$_2$ |
| ViSi(C$_6$H$_4$C$_6$H$_5$)F$_2$ | Z(CH$_2$)$_2$Si(C$_6$H$_4$C$_6$H$_5$)F$_2$ |
| ViSi(Ph$_2$)OH | Z(CH$_2$)$_2$SiPh$_2$OH |
| CH$_2$=CH(CH$_2$)$_{16}$Si(OEt)$_2$(OOCH) | Z(CH$_2$)$_{18}$Si(OEt)$_2$(OOCH) |

EXAMPLE 7

When the following siloxanes are reacted with thiolbenzoic acid in accordance with the procedure of Example 5, the following products are obtained. All percents are mol percent. Z is the PhC=OS— group.

| Siloxane | Product |
| --- | --- |
| (ViMe$_2$SiO)$_4$Si | Z(CH$_2$)$_2$Me$_2$SiO)$_4$Si |
| CH$_2$=CHCH$_2$Si(OSi(Ph)$_2$OH)$_3$ | Z(CH$_2$)$_3$Si(OSi(Ph)$_2$OH)$_3$ |
| CH$_2$=C(Me)CH$_2$SiMe$_2$OSiMe$_2$(C$_{18}$H$_{37}$) | ZCH$_2$CH(Me)CH$_2$SiMe$_2$OSiMe$_2$(C$_{18}$H$_{37}$) |
| 5% ViSiO$_{3/2}$ | 5% Z(CH$_2$)$_2$SiO$_{3/2}$ |
| 10% PhSiO$_{3/2}$ | 10% PhSiO$_{3/2}$ |
| 25% C$_6$H$_{11}$SiO$_{3/2}$ | 25% C$_6$H$_{11}$SiO$_{3/2}$ |
| 40% (MeC$_6$H$_4$)MeSiO | 40% (MeC$_6$H$_4$)MeSiO |
| 20% (ClC$_6$H$_4$)MeSiO | 20% (ClC$_6$H$_4$)MeSiO |
| 20% ViSi(CH$_2$CH$_2$CF$_3$)O | 20% Z(CH$_2$)$_2$Si(CH$_2$CH$_2$CF$_3$)O |
| 20% (CF$_3$C$_6$H$_4$)MeSiO | 20% (CF$_3$C$_6$H$_4$)MeSiO |
| 59% (CF$_3$CH$_2$CH$_2$)MeSiO | 59% (CF$_3$CH$_2$CH$_2$)MeSiO |
| 1% (CF$_3$CH$_2$CH$_2$)Me$_2$SiO$_{.5}$ | 1% (CF$_3$CH$_2$CH$_2$)Me$_2$SiO$_{.5}$ |
| 10% Vi(MeO)$_2$SiO$_{.5}$ | 10% ZCH$_2$CH$_2$(MeO)$_2$SiO$_{.5}$ |
| 20% Cl(CH$_2$)$_3$MeSiO | 20% Cl(CH$_2$)$_3$MeSiO |
| 20% (PhCHC$_2$H$_5$)MeSiO | 20% (PhCH$_2$CH$_2$)MeSiO |
| 50% BrC$_6$H$_4$(Me)SiO | 50% BrC$_6$H$_4$(Me)SiO |
| CH$_2$=CH(CH$_2$)$_{16}$SiMe$_2$O$_{.5}$ | Z(CH$_2$)$_{18}$SiMe$_2$O$_{.5}$ |

That which is claimed is:

1. A compound of the formula $$C_6H_5C=OSRSiR'_nX_mO_{\frac{3-n-m}{2}}$$

in which
R is an alkylene radical of from 2 to 18 carbon atoms,
R' is a monovalent hydrocarbon or halohydrocarbon radical free of aliphatic unsaturation,
X is halogen, alkoxy, carboxyacyl, ketoxime, amineoxy or OH, X being free of aliphatic unsaturation,
R' and X containing no more than 18 carbon atoms,
n has a value from 0 to 2,
m has a value from 0 to 3, and the sum of n+m being not greater than 3.

2. The compound of claim 1 in which R is

—CH$_2$CH$_2$—

R' is methyl, X is chlorine and the sum of n+m equals 3.

3. The compound of claim 2 in which n is 2 and m is 1.

4. A copolymeric siloxane having at least one unit of the formula $$C_6H_5C=OSRSiR'_nX_mO_{\frac{3-n-m}{2}}$$

in which
R is an alkylene radical of from 2 to 18 carbon atoms,

R' is a monovalent hydrocarbon or halohydrocarbon radical free of aliphatic unsaturation,
X is halogen, alkoxy, carboxyacyl, ketoxime, amineoxy or hydroxyl, X being free of aliphatic unsaturation,
R' and X containing no more than 18 carbon atoms,
$n$ has a value from 0 to 2,
$m$ has a value from 0 to 2, and the sum of $n+m$ being not greater than 2,
any remaining siloxane units being of the formula $$R''_a SiO_{\frac{4-a}{2}}$$

in which
R'' is an R group or an X group and
$a$ has a value from 0 to 3 inclusive.

References Cited
UNITED STATES PATENTS

| | | | |
|---|---|---|---|
| 2,544,296 | 3/1951 | Burkhard | 260—448.2 N |
| 2,802,853 | 8/1957 | George | 260—448.2 N |
| 2,863,898 | 12/1958 | Merker | 260—448.2 N |
| 3,445,496 | 5/1969 | Ryan | 260—448.8 R |

TUBIAS E. LEVOW, Primary Examiner

P. F. SHAVER, Assistant Examiner

U.S. Cl. X.R.

260—46.5 E, 399, 448.2 B, 448.8 R